United States Patent
Imaoka

(10) Patent No.: US 8,121,357 B2
(45) Date of Patent: Feb. 21, 2012

(54) COEFFICIENT DETERMINING METHOD, FEATURE EXTRACTING METHOD, SYSTEM, AND PROGRAM, AND PATTERN CHECKING METHOD, SYSTEM, AND PROGRAM

(75) Inventor: Hitoshi Imaoka, Tokyo (JP)

(73) Assignee: NEC Corporation, Tokyo (JP)

( * ) Notice: Subject to any disclaimer, the term of this patent is extended or adjusted under 35 U.S.C. 154(b) by 974 days.

(21) Appl. No.: 12/091,160

(22) PCT Filed: Oct. 23, 2006

(86) PCT No.: PCT/JP2006/321068
§ 371 (c)(1),
(2), (4) Date: Apr. 22, 2008

(87) PCT Pub. No.: WO2007/049560
PCT Pub. Date: May 3, 2007

(65) Prior Publication Data
US 2009/0123077 A1    May 14, 2009

(30) Foreign Application Priority Data
Oct. 24, 2005   (JP) .................................. 2005-309017

(51) Int. Cl.
*G06K 9/62*   (2006.01)

(52) U.S. Cl. ......... 382/118; 382/190; 382/205; 382/228

(58) Field of Classification Search .................. None
See application file for complete search history.

(56) References Cited

U.S. PATENT DOCUMENTS

| 2002/0122593 A1 | 9/2002 | Kato et al. |
| 2004/0017932 A1* | 1/2004 | Yang ............................. 382/118 |
| 2005/0201595 A1 | 9/2005 | Kamei |

FOREIGN PATENT DOCUMENTS

| EP | 1 522 962 A1 | 4/2005 |
| JP | 2000-090274 A | 3/2000 |
| JP | 2002-190025 A | 5/2002 |

(Continued)

OTHER PUBLICATIONS

W. Zhao et al. "Subspace Linear Discriminant Analysis for Face Recognition", Tech. Rep. CAR-TR-914, Centre for Automation Research, University of Maryland, College Park, 1999.

(Continued)

*Primary Examiner* — Brian Werner
(74) *Attorney, Agent, or Firm* — Sughrue Mion, PLLC

(57) ABSTRACT

[PROBLEMS] To provide a feature extracting method for quickly extracting a feature while preventing lowering of the identification performance of the kernel judgment analysis, a feature extracting system, and a feature extracting program. [MEANS FOR SOLVING PROBLEMS] Judgment feature extracting device (104) computes an interclass covariance matrix SB and an intraclass covariance matrix SW about a learning face image prepared in advance, determines optimum vectors $\eta$, $\gamma$ which maximizes the ratio of the interclass covariance to the intraclass covariance, derives a conversion formula for converting an inputted frequency feature vector x into a frequency feature vector y in a judgment space, and extracts judgment features of a face image for record and a face image for check by using a restructured conversion formula. Similarity computing device (105) computes the similarity by comparing the judgment features. Check judging device judges whether or not the persons are the same by comparing the similarity with a threshold.

10 Claims, 4 Drawing Sheets

FOREIGN PATENT DOCUMENTS

JP    2004-192603 A    7/2004
WO    WO 2004-008391 A1    1/2004

OTHER PUBLICATIONS

G. Baudat, et al. "Generalized Discriminant Analysis Using a Kernel Approach", Neural Computation, vol. 12, pp. 2385-2404, 2000.

S. Mika, et al. "A Mathematical Programming Approach to the Kernel Fisher Algorithm", Advances in Neural Information Processing Systems 13, 2001.

Y. Xu, et al. "An efficient renovation on kernel Fisher discriminant analysis and face recognition experiments.", Pattern Recognition, vol. 37, No. 10 Oct. 2004, p. 2091-2094.

* cited by examiner

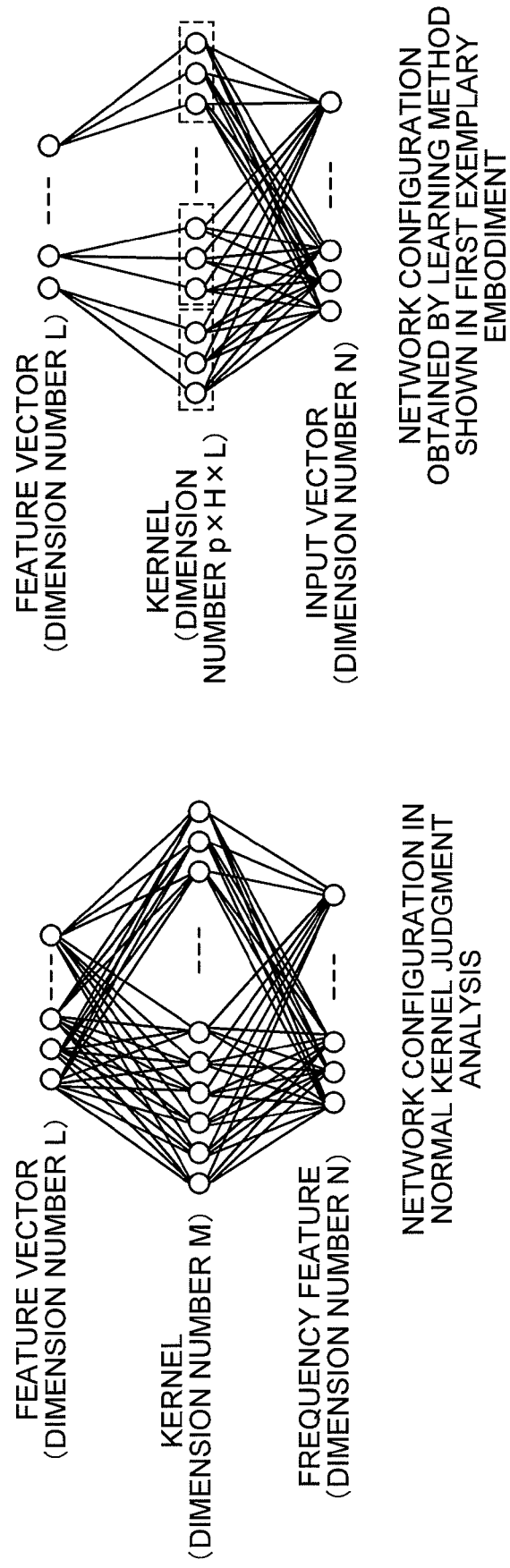

COEFFICIENT DETERMINING METHOD, FEATURE EXTRACTING METHOD, SYSTEM, AND PROGRAM, AND PATTERN CHECKING METHOD, SYSTEM, AND PROGRAM

TECHNICAL FIELD

The present invention relates to a coefficient determining method for determining a coefficient to be used in a calculation for extracting a judgment feature of a pattern; feature extracting method, system, and program for extracting a judgment feature of a pattern; and a pattern checking method, system, and program for checking a pattern for record and a pattern for check.

BACKGROUND ART

In security systems such as an entrance and exit management system and a system using access control, a technique of identifying the person to be identified and another person using physical features of the individual is known (biometrics personal authentication technique). One such technique is a method of authentication by face image. The method of authentication by face image is a method of authenticating the person to be authenticated by comparing the face image photographed with a camera etc. and a face image recorded in a database and the like. However, in the method of authentication by face image, high identification performance generally cannot be obtained with a method of computing similarity by simply overlapping the input image and the recorded image due to influence of direction of the face, illumination condition, date and time of photography, and the like.

A method referred to as Fisher Face method using linear discriminant analysis is used for a method of solving such problem (see e.g., non-patent document 1). The Fisher Face method is a method (linear discriminant analysis method) of assigning one class to each individual when there is a plurality of people so that the interclass variance becomes large and intraclass variance becomes small among a great number of people. This method excels in the checking performance using an actual image compared to the method of simply performing comparison between images.

As opposed to such method, a method referred to as kernel Fisher Face method for extracting the feature using kernel discriminant analysis is known as a method of enhanced identifying accuracy (see non-patent document 2). The kernel discriminant analysis is a method of once projecting the feature to a nonlinear space using a nonlinear kernel, and thereafter performing linear discriminant analysis, and generally, the identification performance is high compared to the Fisher Face method if the number of kernels is sufficiently large. However, since the amount of calculation necessary for feature extraction becomes larger in proportion to the number of kernels, it becomes a problem when applied to the actual system.

A method of applying a restraint condition such that the sum (L1 norm) of the absolute value of weight becomes a minimum, and using an optimum solution by using linear programming when obtaining the weight parameter in a feature space is proposed as a method of reducing the amount of calculation in the kernel discriminant analysis (see non-patent document 3). According to such method, it is proved from the result of the experiment that the number of kernels can be greatly reduced without lowering the identification performance. This method, however, can only be applied in the two class discriminant problem, and cannot handle a general multi-class discriminant problem.

A method of adaptively selecting only the kernel that is important in the discriminant is proposed as a method applicable to the multi-class problem and capable of reducing the amount of calculation (see non-patent document 4). However, as this method reduces the number of kernels, the amount of calculation of the same order as the kernel discriminant analysis is essentially required, and thus it is not suited for greatly reducing the amount of calculation.

A feature vector conversion technique for extracting a feature vector effective in discrimination from input pattern feature vectors, suppressing reduction of the feature amount effective in discrimination when compressing the feature order, and performing a more efficient feature extraction is proposed (see e.g., patent document 1).

Patent document 1: Japanese Laid-Open Patent Publication No. 2004-192603 (paragraphs 0045 to 0055)

Non-patent document 1: W. Zhao, R. Chellappa, P. J. Phillips, "Subspace Linear Discriminant Analysis for Face Recognition", Tech. Rep. CAR-TR-914, Centre for Automation Research, (US), University of Maryland, College Park, 1999

Non-patent document 2: G. Baudat and F. Anouar, "Generalized Discriminant Analysis Using a Kernel Approach", Neural Computation, (US), vol. 12, P.2385-2404, 2000

Non-patent document 3: S. Mika, G. Ratsch, and K. R. Muller. "A Mathematical Programming Approach to the Kernel Fisher Algorithm", Advances in Neural Information Processing Systems 13, (US), 2001

Non-patent document 4: Xu, Y., Yang, J. Y., Lu, J., Yu, D. J., "An efficient renovation on kernel Fisher discriminant analysis and face recognition experiments", Pattern Recognition, (US), vol. 37, No. 10, October 2004, p. 2091-2094

DISCLOSURE OF THE INVENTION

Problems to be Solved by the Invention

In the method using kernel discriminant analysis disclosed in non-patent document 2, the amount of calculation in feature extraction is large, which often becomes a problem in practical use. The method disclosed in non-patent document 4 is a method of reducing the amount of calculation in the kernel discriminant analysis in the multi-class discriminant analysis, but the amount of calculation of the same order as the kernel discriminant analysis is required, and thus is not suited to a case of greatly reducing the amount of calculation.

The method disclosed in patent document 1 has a problem in discrimination since the projection space is linear.

It is therefore an object of the present invention to provide a coefficient determining method, a feature extracting method, a feature extracting system, and a feature extracting program for quickly extracting a feature while preventing lowering of the identification performance of the kernel judgment analysis. It is another object of the present invention to provide a pattern checking method, a pattern checking system, and a pattern checking program using the proposed method.

Means for Solving the Problems

A coefficient determining method according to the present invention relates to a coefficient determining method for determining a coefficient used in a calculation for extracting a judgment feature of a pattern; wherein a computing device of a calculator executes: feature information extracting step for extracting feature information from each of a plurality of patterns stored in advance for every class in a storage device; covariance matrix calculating step for calculating an interclass covariance matrix and an intraclass covariance matrix on a kernel space using the extracted feature information; optimum vector calculating step for calculating an optimum vector which maximizes a ratio of the interclass covariance/intraclass covariance; approximate vector calculating step for calculating an approximate vector which minimizes a square norm with the optimum vector; conversion formula deriving step for deriving a conversion formula for converting the feature information to a judgment feature of the pattern using the calculated approximate vector; coefficient storing step for storing the coefficient in the derived conversion formula as a coefficient to be substituted to the conversion formula for extracting the judgment feature of the pattern when carrying out pattern check; and covariance matrix recalculating step for recalculating the interclass covariance matrix using the judgment feature obtained by the conversion formula; wherein the computing device repeatedly executes the optimum vector calculating step, the approximate vector calculating step, the conversion formula deriving step, the coefficient storing step, and the covariance matrix recalculating step using the recalculated interclass covariance matrix until reaching a maximum iteration count, which is the number of judgment features.

When applying the coefficient determining method to the authentication for identifying a person, the face image of the person is used as a pattern.

A three layer structure including an input layer for inputting the feature information of the pattern as an input signal, an output layer for outputting the judgment feature to the outside as an output signal, and an intermediate layer for transmitting the signal from the input layer to the output layer, the nodes of the input layer and the intermediate layer all being connected, and the node of the output layer having a signal input from one part of the nodes of the intermediate layer is preferably adopted.

A feature extracting method according to the present invention relates to a feature extracting method for extracting a judgment feature of a pattern; wherein a computing device of a calculator executes: feature information extracting step for extracting feature information from each of a plurality of patterns stored in advance for every class in a storage device; covariance matrix calculating step for calculating an interclass covariance matrix and an intraclass covariance matrix on a kernel space using the extracted feature information; optimum vector calculating step for calculating an optimum vector which maximizes a ratio of the interclass covariance/intraclass covariance; approximate vector calculating step for calculating an approximate vector which minimizes a square norm with the optimum vector; conversion formula deriving step for deriving a conversion formula for converting the feature information to a judgment feature of the pattern using the calculated approximate vector; coefficient storing step for storing the coefficient in the derived conversion formula as a coefficient to be substituted to the conversion formula for extracting the judgment feature of the pattern when carrying out pattern check; and covariance matrix recalculating step for recalculating the interclass covariance matrix using the judgment feature obtained by the conversion formula; the computing device repeatedly executes the optimum vector calculating step, the approximate vector calculating step, the conversion formula deriving step, the coefficient storing step, and the covariance matrix recalculating step using the recalculated interclass covariance matrix until reaching a maximum iteration count, which is the number of judgment features; and the computing device further executes, feature information extracting step for extracting the feature information from a pattern to be checked; and judgment feature computing step for computing the judgment feature of the pattern to be checked by substituting the feature information to the conversion formula derived in the conversion formula deriving step.

A feature extracting system according to the present invention relates to a feature extracting system for extracting a judgment feature of a pattern; the feature extracting system including a feature information extracting device for extracting feature information from each of a plurality of patterns stored in advance for every class in a storage device; a covariance matrix calculating device for calculating an interclass covariance matrix and an intraclass covariance matrix on a kernel space using the extracted feature information; an optimum vector calculating device for calculating an optimum vector which maximizes a ratio of the interclass covariance/intraclass covariance; an approximate vector calculating device for calculating an approximate vector which minimizes a square norm with the optimum vector; a conversion formula deriving device for deriving a conversion formula for converting the feature information to a judgment feature of the pattern using the calculated approximate vector; a coefficient storing device for storing the coefficient in the derived conversion formula as a coefficient to be substituted to the conversion formula for extracting the judgment feature of the pattern when carrying out pattern check; and a covariance matrix recalculating device for recalculating the interclass covariance matrix using the judgment feature obtained by the conversion formula; wherein the optimum vector calculating device, the approximate vector calculating device, the conversion formula deriving device, the coefficient storing device, and the covariance matrix recalculating device repeatedly execute the processes using the recalculated interclass covariance matrix until reaching a maximum iteration count, which is the number of judgment features; the feature information extracting device extracts the feature information from a pattern to be checked when performing pattern check; and the system further includes a judgment feature computing device for computing the judgment feature of the pattern to be checked by substituting the feature information to the conversion formula derived by the conversion formula calculating device.

A feature extracting program according to the present invention relates to a feature extracting program for extracting a judgment feature of a pattern, wherein the program causes a computing device of a calculator to execute: feature information extracting process for extracting feature information from each of a plurality of patterns stored in advance for every class in a storage device; covariance matrix calculating process for calculating an interclass covariance matrix and an intraclass covariance matrix on a kernel space using the extracted feature information; optimum vector calculating process for calculating an optimum vector which maximizes a ratio of the interclass covariance/intraclass covariance; approximate vector calculating process for calculating an approximate vector which minimizes a square norm with the optimum vector; conversion formula deriving process for deriving a conversion formula for converting the feature information to a judgment feature of the pattern using the calculated approximate vector; coefficient storing process for storing the coefficient in the derived conversion formula as a coefficient to be substituted to the conversion formula for extracting the judgment feature of the pattern when carrying out pattern check; and covariance matrix recalculating process for recalculating the interclass covariance matrix using the judgment feature obtained by the conversion formula;

further causing the computing device to repeatedly execute the optimum vector calculating process, the approximate vector calculating process, the conversion formula deriving process, the coefficient storing process, and the covariance matrix recalculating process using the recalculated interclass covariance matrix until reaching a maximum iteration count, which is the number of judgment features; and further causing the computing device to execute feature information extracting process for extracting the feature information from a pattern to be checked; and judgment feature computing process for computing the judgment feature of the pattern to be checked by substituting the feature information to the conversion formula derived in the conversion formula calculating process.

A pattern checking method according to the present invention relates to a pattern checking method for checking a pattern for record and a pattern for check; wherein a computing device of a calculator executes: feature information extracting step for extracting feature information from each of a plurality of patterns stored in advance for every class in a storage device; covariance matrix calculating step for calculating an interclass covariance matrix and an intraclass covariance matrix on a kernel space using the extracted feature information; optimum vector calculating step for calculating an optimum vector which maximizes a ratio of the interclass covariance/intraclass covariance; approximate vector calculating step for calculating an approximate vector which minimizes a square norm with the optimum vector; conversion formula deriving step for deriving a conversion formula for converting the feature information to a judgment feature of the pattern using the calculated approximate vector; coefficient storing step for storing the coefficient in the derived conversion formula as a coefficient to be substituted to the conversion formula for extracting the judgment feature of the pattern when carrying out pattern check; and covariance matrix recalculating step for recalculating the interclass covariance matrix using the judgment feature obtained by the conversion formula; wherein the computing device repeatedly executes the optimum vector calculating step, the approximate vector calculating step, the conversion formula deriving step, the coefficient storing step, and the covariance matrix recalculating step using the recalculated interclass covariance matrix until reaching a maximum iteration count, which is the number of judgment features; and the computing device further executes feature information extracting step for extracting the feature information from the pattern for record and the pattern for check; judgment feature computing step for computing the judgment feature of the pattern for record and the pattern for check by substituting the feature information to the conversion formula derived in the conversion formula deriving step; similarity computing step for computing a similarity by comparing the judgment feature of the pattern for record and the judgment feature of the pattern for check; and target determining step for determining whether or not the pattern for record and the pattern for check are the same by comparing the calculated similarity with a predetermined threshold value.

A pattern checking program according to the present invention relates to a pattern checking program for checking a pattern for record and a pattern for check; wherein the program causes a computing device of a calculator to execute: feature information extracting process for extracting feature information from each of a plurality of patterns stored in advance for every class in a storage device; covariance matrix calculating process for calculating an interclass covariance matrix and an intraclass covariance matrix on a kernel space using the extracted feature information; optimum vector calculating process for calculating an optimum vector which maximizes a ratio of the interclass covariance/intraclass covariance; approximate vector calculating process for calculating an approximate vector which minimizes a square norm with the optimum vector; conversion formula deriving process for deriving a conversion formula for converting the feature information to a judgment feature of the pattern using the calculated approximate vector; coefficient storing process for storing the coefficient in the derived conversion formula as a coefficient to be substituted to the conversion formula for extracting the judgment feature of the pattern when carrying out pattern check; and covariance matrix recalculating process for recalculating the interclass covariance matrix using the judgment feature obtained by the conversion formula; further causing the computing device to repeatedly execute the optimum vector calculating process, the approximate vector calculating process, the conversion formula deriving process, the coefficient storing process, and the covariance matrix recalculating process using the recalculated interclass covariance matrix until reaching a maximum iteration count, which is the number of judgment features; and further causing the computing device to execute the feature information extracting process for extracting the feature information from a pattern for record and the pattern for check; judgment feature computing process for computing the judgment feature of the pattern for record and the pattern for check by substituting the feature information to the conversion formula derived in the conversion formula deriving process; similarity computing process for computing a similarity by comparing the judgment feature of the pattern for record and the judgment feature of the pattern for check; and target determining process for determining whether or not the pattern for record and the pattern for check are the same by comparing the calculated similarity with a predetermined threshold value.

A pattern checking system according to the present invention relates to a pattern checking system for checking a pattern for record and a pattern for check; the pattern checking system including a feature information extracting device for extracting feature information from each of a plurality of patterns stored in advance for every class in a storage device; a covariance matrix calculating device for calculating an interclass covariance matrix and an intraclass covariance matrix on a kernel space using the extracted feature information; an optimum vector calculating device for calculating an optimum vector which maximizes a ratio of the interclass covariance/intraclass covariance; an approximate vector calculating device for calculating an approximate vector which minimizes a square norm with the optimum vector; a conversion formula deriving device for deriving a conversion formula for converting the feature information to a judgment feature of the pattern using the calculated approximate vector; a coefficient storing device for storing the coefficient in the derived conversion formula as a coefficient to be substituted to the conversion formula for extracting the judgment feature of the pattern when carrying out pattern check; and a covariance matrix recalculating device for recalculating the interclass covariance matrix using the judgment feature obtained by the conversion formula; wherein the optimum vector calculating device, the approximate vector calculating device, the conversion formula deriving device, the coefficient storing device, and the covariance matrix recalculating device repeatedly execute the processes described above using the recalculated interclass covariance matrix until reaching a maximum iteration count, which is the number of judgment features; the feature information extracting device extracts the feature information from a pattern for record and the pattern for check when performing pattern check; and the system further includes, a judgment feature computing device for computing the judgment feature of the pattern to be checked by substituting the feature information to the conversion formula derived by the conversion formula deriving device; a similarity computing device for computing a similarity by comparing the judgment feature of the pattern for record and the judgment feature of the pattern for check; and a target determining device for determining whether or not the pattern for record and the pattern for check are the same by comparing the calculated similarity with a predetermined threshold value.

In addition to the configuration described above, the present invention also discloses an image input device for inputting a learning face image, a face image for record, and a face image for check; a feature position detecting device for detecting the position of the feature defined in advance from each image input from the image input device; an image normalizing device for normalizing the size and the position of each image based on the position of the feature detected by the feature position detecting device; and the like.

Effects of the Invention

According to the present invention, the feature can be extracted with small amount of calculation when the number of judgment feature to be extracted is few by calculating an optimum vector approximated so that the ratio of an interclass covariance matrix and an intraclass covariance matrix of the feature vector becomes a maximum and the square norm becomes a minimum.

Best Mode for Carrying out the Invention

Exemplary embodiments of the present invention will now be described with reference to the drawings. FIG. 1 is a block diagram showing one example of a configuration of a pattern checking system for checking patterns between two-dimensional face images according to the present invention. As shown in FIG. 1, a pattern checking system 10 includes an image input device 100, a face position detecting device 101, an image normalizing device 102, a frequency feature extracting device 103, a judgment feature extracting device 104, a similarity computing device 105, and a check judging device 106.

Specifically, the pattern checking system 10 is realized using an information processing device such as one or a plurality of work stations or a personal computer. For instance, the pattern checking system 10 is applied to security systems such as an entrance and exit management system and a system using access control. In the security system, the pattern checking system 10 is used in an application of a same person determination system for determining whether or not a person viewed in two face images is the same when performing a first-person authentication.

The image input device 100 inputs a face image for check and a face image for record, and outputs the input face images for check and for record to the face position detecting device 101 for extracting a face feature point position. For instance, the information processing device for realizing the pattern checking system 10 includes an imaging device (not shown) such as a camera, and a storage device (not shown) such as a hard disc. In this case, the image input device 100 inputs the face image for check photographed by the imaging device, and the face image for record stored in the storage device.

The face position detecting device 101 detects positions of eyes, nose, and mouth from the face image for record and the face image for check output from the image input device 100. At least the position of the eyes needs to be detected here. The face position detecting device 101 outputs an image luminance and eye position coordinates to the image normalizing device 102 for the face image for record and the face image for check. The image luminance is the luminance at a position coordinate (a, b) of each pixel. The face position detecting device 101 performs a similar process on a learning face image stored in the judgment feature extracting device 104.

The image normalizing device 102 normalizes the size and the position of the face using the image luminance and the eye position coordinates output by the face position detecting device 101. The image normalizing device 102 rotates the image so that the eye positions become horizontal, and thereafter, enlarges or reduces the image so that the distance between the eyes becomes constant, obtains a center position of both eyes, and cuts out the face of a constant size in width and height directions from the center position. The image cut out to a constant size is referred to as a normalized image. The image normalizing device 102 generates the normalized image for both the face image for record and the face image for check, and outputs a normalized image luminance I(a, b) of the obtained face image for record and the face image for check to the feature extracting device 103. The normalized image luminance I(a, b) indicates the luminance at the position coordinate (a, b) of each pixel in the normalized image. The image normalizing device 102 performs a similar process on the learning face image stored in the judgment feature extracting device 104.

The frequency feature extracting device 103 has a function of extracting a frequency feature from the normalized image obtained in the image normalizing device 102. "Frequency feature" is feature information of the image obtained by extracting a frequency component from the image, and is represented by vector. In the exemplary embodiment, the frequency feature extracting device 103 extracts the frequency feature for both the normalized image generated from the face image for record and the normalized image generated from the face image for check. That is, the frequency feature extracting device 103 extracts the frequency feature f(a0, b0, s, ka, kb) using Gabor filter shown in equation (1) and equation (2) based on the normalized image luminance I(a, b) output from the image normalizing device 102.

$$g(a, b) = \frac{1}{\sqrt{2\pi} s} \exp\left\{-\frac{a^2 + b^2}{2s^2} + i(k_a a + k_b b)\right\} \quad \text{Equation (1)}$$

$$f(a_0, b_0, s, k_a, k_b) = \sum_a \sum_b g(a - a_0, b - b_0) I(a, b) \quad \text{Equation (2)}$$

In equation (1) and equation (2), a0, b0, s, ka, and kb are arbitrary parameters. The frequency feature extracting device 103 extracts N frequency features from the normalized image by changing the values of the parameters. The frequency feature extracting device 103 outputs the N frequency features obtained from each of the face image for record and the face image for check to the judgment feature extracting device 104. The frequency feature extracting device 103 also performs a similar process on the learning face image stored in the judgment feature extracting device 104.

The judgment feature extracting device 104 includes a learning face image database (not shown). The judgment feature extracting device 104 has a function of deriving a conversion formula for converting a frequency feature vector x in an arbitrary image to a judgment feature vector y in a judgment space by computing a judgment axis (optimum vector) configuring a judgment space based on the frequency feature vector of the learning face image.

The judgment space is a space defined by the optimum vector. The terminating ends of a plurality of frequency feature vectors are mapped to the judgment space thereby separating similar data to be more similar and different data to be more different. The judgment feature extracting device 104 derives a conversion matrix and the like as a conversion formula (hereinafter referred to as judgment feature extraction formula) for converting the frequency feature vector to the judgment feature vector of the judgment space.

The judgment feature extracting device 104 also has a function of outputting the judgment feature of the face image for record and the face image for check, that is, the judgment feature vector in the judgment space by substituting the frequency feature of the face image for record and the face image for check output from the frequency feature extracting device 103 to the derived judgment feature extraction formula.

The similarity computing device 105 compares the judgment features of the face image for record and the face image for check output from the judgment feature extracting device 104, computes the similarity S, and outputs the same to the check judging device 106.

The check judging device 106 has a function of determining whether or not the person (hereinafter referred to as recorded person) in the face image for record and the person (hereinafter referred to as check person) in the face image for check are the same person. In this case, the check judging device 106 judges whether or not the similarity S is greater than a predetermined threshold value T. If the similarity S is greater than the threshold value T, the recorded person and the check person are determined to be the same person, and in other cases, the recorded person and the check person are determined to be a different person.

When the pattern checking system 10 is realized by an information processing device such as a server device, the image input device 100 is specifically realized by a CPU and an input interface unit mounted on the information processing device that operates according to a program. The face position detecting device 101, the image normalizing device 102, the frequency feature extracting device 103, the judgment feature extracting device 104, the similarity computing device 105, and the check judging device 106 are realized when the CPU mounted on the information processing device executes a program for realizing their functions.

The operation of the exemplary embodiment will now be described with reference to the drawings. FIG. 2 is a flowchart showing the operation of the pattern checking system 10 of the exemplary embodiment.

When the face image for record and the face image for check are output from the image input device 100, the face position detecting device 101 detects the eye positions as facial feature point positions with respect to the face image for record and the face image for check, and outputs the image luminance and the eye position coordinates to the image normalizing device 102 (step S100).

The image normalizing device 102 performs normalization so that the size and the position of the face region become constant based on the image luminance and the eye position coordinates of each of the face image for record and the face image for check (step S101). The image normalizing device 102 outputs the respective normalized image luminance I(a, b) of the face image for record and the face image for check to the feature extracting device 103.

The frequency feature extracting device 103 extracts the frequency feature (a0, b0, s, ka, kb) from the normalized image obtained in the image normalizing device 102 (step S102). The frequency feature extracting device 103 outputs N frequency features obtained from each of the face image for record and the face image for check to the judgment feature extracting device 104.

The judgment feature extracting device 104 derives the judgment feature extraction formula. The operation for the judgment feature extracting device 104 to compute the judgment feature extraction formula will be hereinafter described. The judgment feature extracting device 104 substitutes the frequency feature of the face image for record and the face image for check output from the frequency feature extracting device 103 to the derived judgment feature extraction formula to extract the respective judgment feature, and outputs the judgment features to the similarity computing device 105 (step S103).

The similarity computing device 105 compares the judgment features of the face image for record and the face image for check output from the judgment feature extracting device 104, and computes the similarity (step S104). The similarity computing device 105 outputs the computed similarity to the check judging device 106.

The check judging device 106 compares the similarity output from the similarity computing device 105 with a predetermined threshold value to determine whether or not the person in the face image for record and the person in the face image for check are the same person (step S105), and terminates the series of processes.

A method of structuring a judgment space used by the judgment feature extracting device 104, that is, a method of deriving the judgment feature extraction formula will now be described. FIG. 3 is a flowchart showing the operation for the judgment feature extracting device 104 to structure the judgment space according to the exemplary embodiment.

Suppose about ten face images per person is stored for a few hundred people in a learning face image database. With respect to each learning face image, the image input device 100, the face position detecting device 101, the image normalizing device 102, and the frequency feature extracting device 103 extract N frequency features per one image through a method same as the method shown in steps S100 to S102 (step S200). The frequency features of one image are represented as N-dimensional frequency feature vector.

The number of person (hereinafter referred to as number of class) contained in the learning face image is C, and the total number of learning face images is M. The frequency feature of the $i^{th}$ learning face image of the learning face images of the $k^{th}$ person is represented as xki in the N-dimensional vector. Here, k is a positive integer from 1 to C, and i is a positive integer from 1 to Mk. Mk indicates the number of learning face images of the $k^{th}$ person. In the following description, the term "$k^{th}$ person" is expressed as "$k^{th}$ class".

Using the frequency features obtained in step S200, an interclass covariance matrix SB and an intraclass covariance matrix SW on the kernel space are computed using equation (3) and equation (4), respectively (step S201).

$$S_B = KDK \qquad \text{Equation (3)}$$

$$S_W = KK \qquad \text{Equation (4)}$$

Here, K is the M-dimensional matrix, and is configured by small matrixes of C×C. The matrix K can be written as equation (5).

$$K = (K_{kl})_{k=1,\ldots,c,\, l=1,\ldots,c} \qquad \text{Equation (5)}$$

The small matrix Kkl is a matrix of Mk×Ml with the number of learning face images contained in the $k^{th}$ and the $l^{th}$ class as Mk and Ml, respectively. The (i, j)$^{th}$ element (Kkl)ij of the small matrix Kkl can be written as equation (6) using the frequency feature xki in the $i^{th}$ learning face image of the $k^{th}$ class and the frequency feature xlj in the $j^{th}$ learning face image of the $l^{th}$ class.

$$(K_{Kl})_{ij} = \phi(x_{ki}, x_{lj})  \quad \text{Equation (6)}$$

Here, function φ is a non-linear function called kernel function. Similar to matrix K, the matrix D in equation (3) is an M-dimensional matrix and is configured by small matrixes of C×C. The matrix D can be written as equation (7).

$$D = (D_{kl})_{k=1,\ldots,c,\, l=1,\ldots,c} \quad \text{Equation (7)}$$

The small matrix Dkl is a matrix of Mk×Ml. Each element of the small matrix Dkl is a matrix in which all the elements have a value of 1/Mk when k=l, and all the elements have a value of 0 when k≠l. In step S201, the covariance matrixes SB and SW are ultimately obtained.

In step S202, one vector which maximizes the ratio of the interclass/intraclass variance is obtained. That is, a matrix (SW)-1SB in which the interclass covariance matrix is multiplied to an inverse matrix (SW)-1 of the intraclass covariance matrix SW is obtained, and an eigenvector Ul corresponding to the maximum eigenvalue is obtained. Here, Ul is a vector having elements of M learning face images. The element of Ul is specified with k indicating the class order and i indicating the order in the same class, and is expressed as (Ul)ki.

In step S203, the obtained eigenvector Ul is approximated, and the kernel function is restructured so that feature extraction can be performed with only a small number of kernels. The judgment feature, that is, the judgment feature vector y(x) is calculated by equation (8) including the optimum vector Ul obtained in step S202.

$$y_l(x) = \Sigma_{k=1}^{C} \Sigma_{i=1}^{Mk} (U_l)_{ki} \phi(x_{ki}, x) \quad \text{Equation (8)}$$

Here, x is a frequency feature vector in an arbitrary image, xki is a frequency feature vector in a learning face image of the $i^{th}$ learning face image of the $k^{th}$ class, yl(x) is a first element of the judgment feature vector obtained when x is substituted to the right side of equation (8). In order to reduce the sum related to variables k, i in equation (8), the kernel function φ(xki, x) is limited to a linear combination (equation (9)) of a power of an inner product related to xki, x.

$$\phi(x_{ki}, x) = \Sigma_{i=0}^{P} t_i (x_{ki}, x)^i \quad \text{Equation (9)}$$

Here, (xki, x) represents the inner product of vectors xki and x. A parameter ti (i=0, . . . , p) is a certain fixed value. Furthermore, p is a value that can be freely set. Using equation (9), equation (8) can be expanded as, $$y_l(x) = \Sigma_{k=1}^{C} \Sigma_{i=1}^{Mk} (U_l)_{ki} \Sigma_{q=0}^{P} t_q (x_{ki}, x)^q \quad \text{Equation (10)}$$

In equation (10), a new variable b described as, $$b_{l,q,j1,j2,\ldots,jq} = \Sigma_{k=1}^{C} \Sigma_{i=1}^{Mk} (U_l)_{ki} (x_{ki})_{j1} (x_{ki})_{j2} \ldots (x_{ki})_{jq} \quad \text{Equation (11)}$$

is introduced and substituted to equation (10), and $$y_l(x) = \Sigma_{q=0}^{P} t_q \Sigma_{j1=1}^{N} \Sigma_{j2=1}^{N} \ldots \Sigma_{jq=1}^{N} b_{l,q,j1,j2,\ldots,jq} (x)_{j1} (x)_{j2} \ldots (x)_{jq} \quad \text{Equation (12)}$$

is derived. The variable b is approximated to $$b_{l,q,j1,j2,\ldots,jq} = \Sigma_{i=1}^{L} \eta_{l,qi} \gamma_{l,qij1} \ldots \gamma_{qijq} \quad \text{Equation (13)}$$

Here, L indicates the number of judgment features to be obtained, that is, the number of elements of the judgment feature vector y(x). Estimating b from the least square method, the optimum values (optimum vector), that is, the values of η and γ which minimize the error of b are, $$[\eta_{1q}, \gamma_{1q}] = \underset{\eta, \gamma}{\operatorname{argmin}} \sum_{j1=1}^{N} \sum_{j2=1}^{N} \cdots \sum_{jq=1}^{N} \left( b_{1,q,j1,j2,\ldots,jq} - \sum_{i=1}^{H} \eta_{1,qi} \gamma_{1,qij1} \cdots \gamma_{qijq} \right)^2 \quad \text{Equation (14)}$$

In equation (14), the square norm with the optimum vector is shown. Here, H is the number of vectors after approximation. η1q and γ1q are respectively H-dimensional vectors. The q is a value between 0 and p, where the vectors η11, η12, . . . , η1q and the vectors γ11, γ12, . . . , γ1q are obtained from equation (14). Substituting the obtained vectors η11, η12, . . . , η1q and vectors γ11, γ12, . . . , γ1q to equation (12), $$y_l(x) = \Sigma_{q=0}^{P} t_q \Sigma_{i=1}^{H} \eta_{l,qi} (x, \gamma_{l_{q}})^q \quad \text{Equation (15)}$$

is obtained. Here, η1, qi indicates as being the $i^{th}$ element of the vector η1q. The judgment feature extracting device 104 holds tq, and the vectors η11, η12, . . . , η1p and the vectors γ11, γ12, . . . , γ1p obtained in the present step as the learning result. As hereinafter described, when the judgment feature extracting device 104 extracts the judgment feature, the judgment feature is extracted using equation (15). In equation (15), y1(x) is the first element of the judgment feature vector with respect to an arbitrary frequency feature vector x.

In step S204, the interclass covariance matrix SB is recalculated using equation (16). It is because, as hereinafter described, when the process proceeds from step S205 to step S202, and the processes of step S202 and step S203 are again executed to obtain the second and subsequent vectors, the vector orthogonal to the first feature vector obtained in step S203 is to be obtained.

$$S_B = KD(I - pp'/p'p)K \quad \text{Equation (16)}$$

Here, ρ is, $$(p)_{ki} = y_l(x_{ki}) \quad \text{Equation (17)}$$

and is the M-dimensional vector.

In step 205, determination is made on whether or not the number of elements of the obtained judgment feature vector y(x) is greater than or equal to the number of judgment features to be obtained, that is, the maximum iteration counts L, where if NO, the process returns to step S202, and the operation after step S202 is performed using the interclass covariance matrix SB recalculated with equation (16). In the second process, the judgment feature extracting device 104 obtains the vectors η21, η22, . . . , η2p and the vectors γ21, γ22, . . . , γ2p.

If YES in step S205, the judgment feature extracting device 104 terminates learning. The judgment feature extracting device 104 holds tq, ηiq, γiq (i=1, 2, . . . , L) (q=1, 2, . . . , p) as the learning result to use when extracting the judgment feature.

The judgment feature extracting device 104 calculates the judgment feature vector from equation (15) using the parameters tq, ηiq, γiq obtained through the above learning. The judgment feature extracting device 104 first uses the vectors η11, η12, . . . , η1p and the vectors γ11, γ12, . . . , γ1p obtained in the first process to obtain y1(x), which is the first element of the judgment feature vector with respect to the frequency feature vector x of the face image for record. Then, the judgment feature extracting device 104 uses the vectors η21, η22, . . . , η2p and the vectors γ21, γ22, . . . , γ2p obtained in the second process to obtain y2(x), which is the second element of the judgment feature vector with respect to the frequency feature vector x of the face image for record. Similarly, the judgment feature vector y(x) having L number of elements is calculated by outputting L number of elements for the maximum iteration counts. The judgment feature extracting device 104 performs a similar process on the face image for check to compute the judgment feature vector.

FIG. 4 shows a network configuration of a feature extractor according to the exemplary embodiment and a network configuration of a general kernel judgment analysis (see non-patent document 2). The bottommost layer is the input layer, the layer at the middle is the intermediate layer, and the uppermost layer is the output layer. The input layer is the layer configured by nodes for receiving an input signal, the intermediate layer is the layer for receiving the signal from the input layer and transmitting the signal to the output layer, and the output layer is the layer for receiving the signal from the intermediate layer and outputting the signal to the outside. The node is an element configuring each layer. The node of the input layer represents the element of the frequency feature vector, the node of the intermediate layer represents the kernel function, and the node of the output layer represents the element of the judgment feature vector. The number of lines between the nodes indicates the amount of calculation.

The figure shown on the left side in FIG. 4 is the network configuration of a general kernel judgment analysis using equation (8). In equation (8), the amount of calculation per one kernel function is N, and thus the amount of calculation of M number of kernel functions is represented as N×M. Furthermore, the amount of calculation of one element of the judgment feature vector is M and the number of elements is L, and thus the amount of calculation of the judgment feature vector is represented as M×L. Therefore, the amount of calculation of a general kernel judgment analysis is in the order of N×M+M×L=(N+L)×M.

The figure shown on the right side in FIG. 4 is the network configuration of the feature extractor according to the exemplary embodiment using equation (15). The number of squares is the number of elements L of the judgment vector, and the number of kernels contained in the square is p×H. In equation (15), the amount of calculation per one kernel function is N. Since the number of kernel functions is p×H×L, the amount of calculation of all the kernel functions is represented as p×H×L×N. Furthermore, the amount of calculation of one element of the judgment feature vector is p×H, and the number of elements is L, and thus the amount of calculation of the judgment feature vector is represented as p×H×L. Therefore, the amount of calculation of the feature extractor according to the exemplary embodiment is in the order of p×H×L×N+p×H×L=(N+1)×p×H×L.

In step S104, the similarity computing device 105 compares the judgment features of the face image for record and the face image for check and computes the similarity. In the exemplary embodiment, normalized correlation $$s=(y_1,y_2)/|y_1||y_2| \quad \text{Equation (18)}$$

is used. Here, y1 is the judgment feature in the face image for record and y2 is the judgment feature in the face image for check. The obtained similarity S is output to the check judging device 106.

As described above, in the exemplary embodiment, the restructured judgment feature vector described in equation (15) is used in the judgment feature extracting device 104. In this case, the amount of calculation necessary for feature extraction is in the order of (N+1)×p×H×L. In the normal kernel judgment analysis, the amount of calculation is in the order of (N+L)×M since equation (8) is used. The amount of calculation is proportional to L in the method described in the exemplary embodiment, whereas the amount of calculation in the order of N×M is necessary even if L is 0 in the normal kernel judgment analysis. That is, if the number of judgment features to be extracted is small, the method described in the exemplary embodiment enables feature extraction with lesser amount of calculation.

In the exemplary embodiment, a frequency feature vector has been illustrated and described as the feature vector, but it is not limited to a frequency feature.

INDUSTRIAL APPLICABILITY

According to the present invention, use in the security fields such as entrance and exit management system and access control is expected through checking between face images.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2005-309017, filed on Oct. 24, 2005, the disclosure of which is incorporated herein in its entirety by reference.

BRIEF DESCRIPTION OF THE DRAWINGS

FIG. 4 shows a network configuration of a feature extractor according to the exemplary embodiment and a network configuration of a general kernel judgment analysis.

DESCRIPTION OF SYMBOLS

Figure 1:
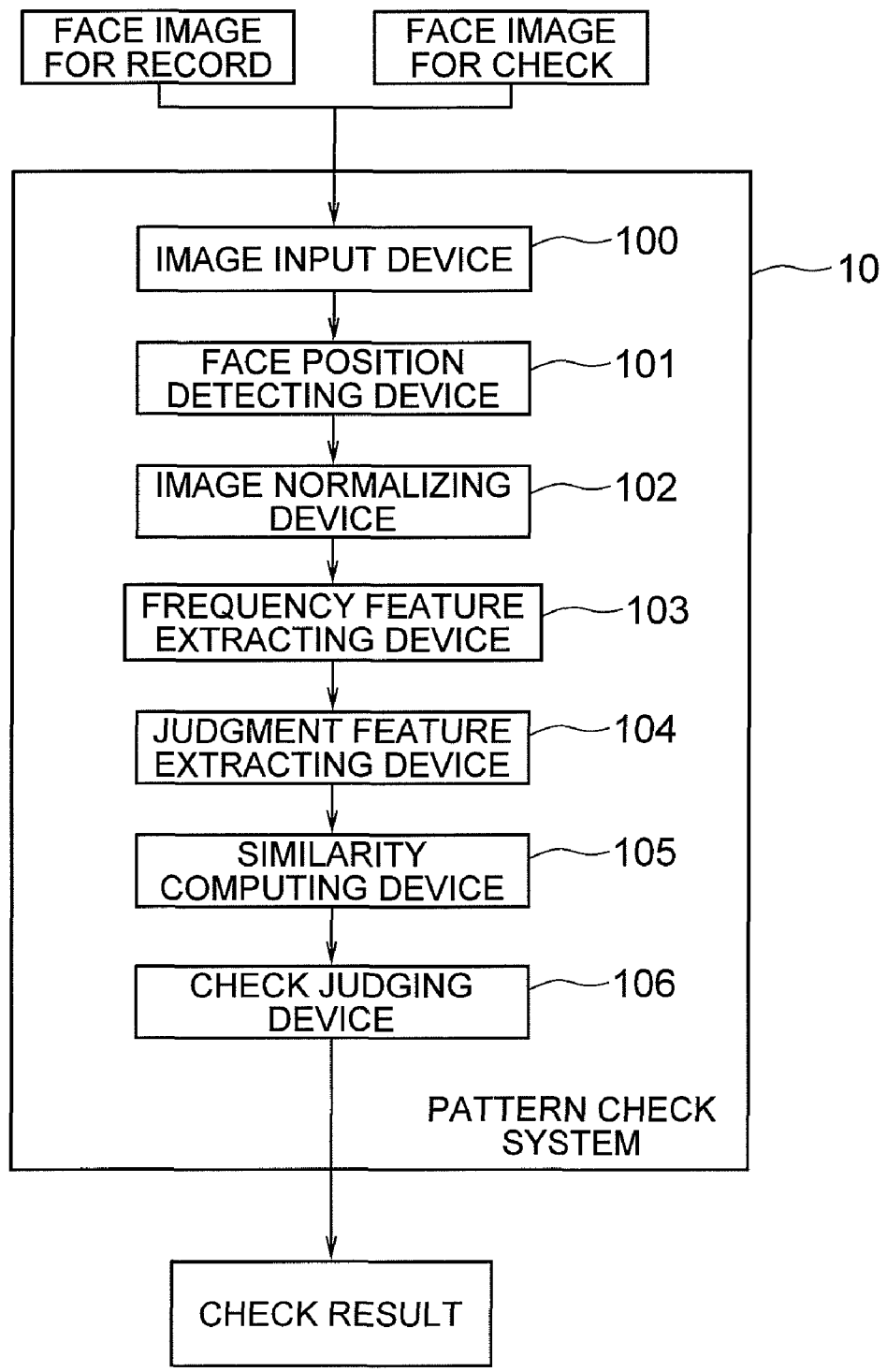
FIG. 1 is a block diagram showing one example of a configuration of a pattern checking system according to the present invention.
Figure 2:
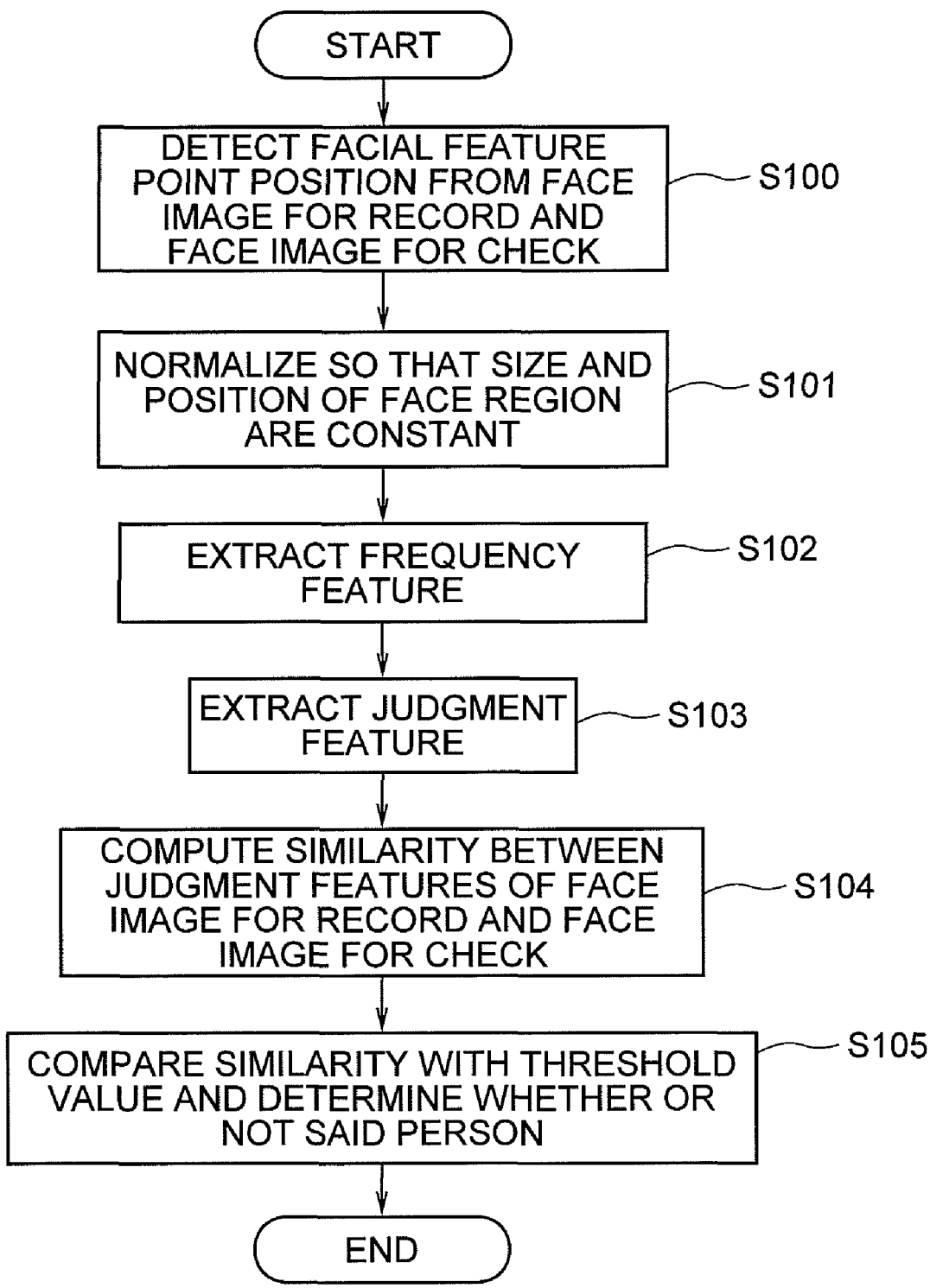
FIG. 2 is a flowchart showing an operation of the pattern checking system according to the exemplary embodiment.
Figure 3:
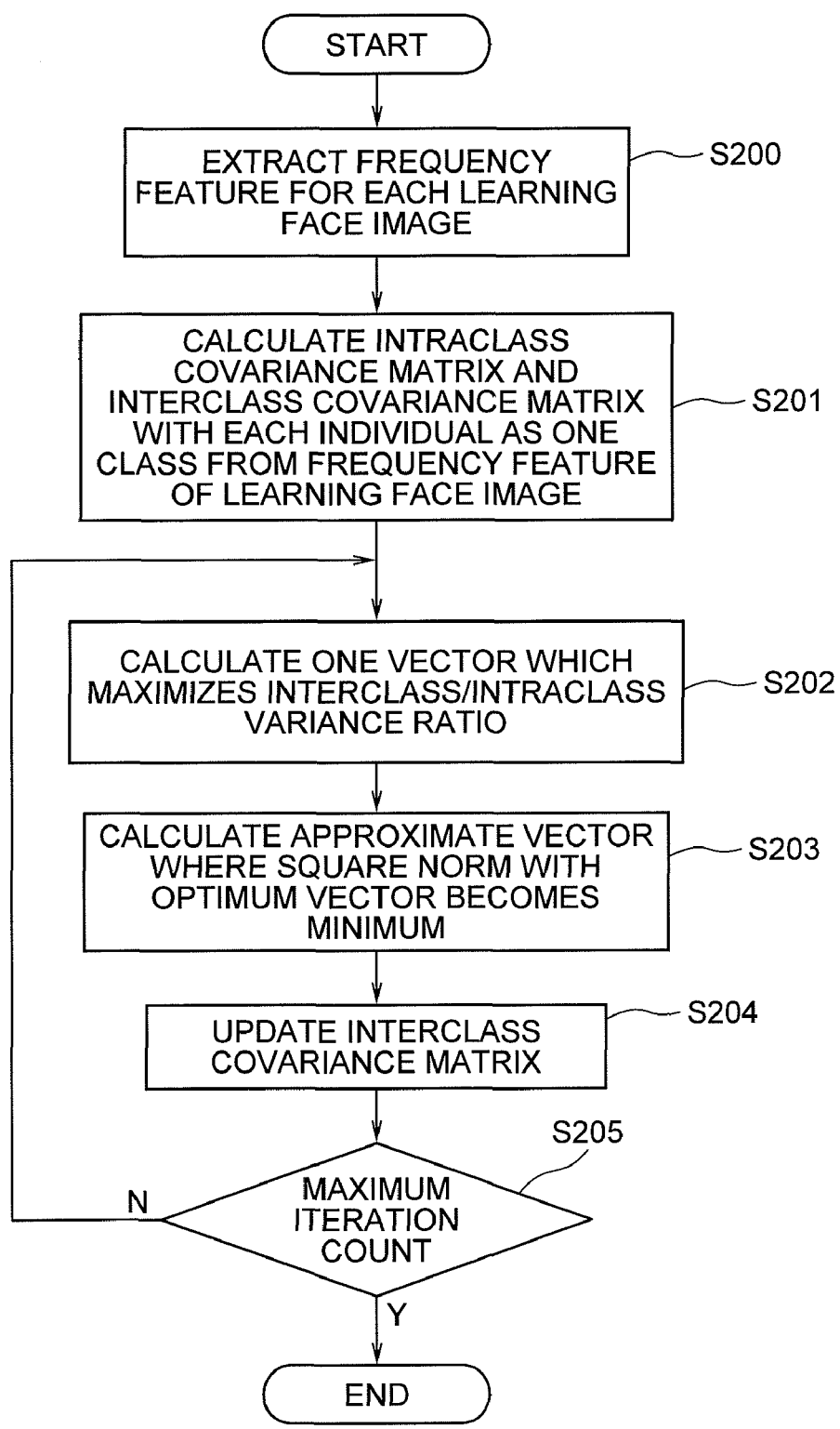
FIG. 3 is a flowchart showing an operation for a judgment feature extracting device to restructure a judgment space according to the exemplary embodiment.

10 pattern checking system
100 image input device
101 face position detecting device
102 image normalizing device
103 frequency feature extracting device
104 judgment feature extracting device
105 similarity computing device
106 check judging device

The invention claimed is:

1. A coefficient determining method for determining a coefficient used in a calculation for extracting a judgment feature of a pattern; wherein
   a computing device of a calculator executes a method comprising:
   extracting feature information from each of a plurality of patterns stored in advance for every class in a storage device;
   calculating an interclass covariance matrix and an intraclass covariance matrix on a kernel space using the extracted feature information;
   calculating an optimum vector which maximizes a ratio of the interclass covariance/intraclass covariance;

calculating an approximate vector which minimizes a square norm with the optimum vector;
deriving a conversion formula for converting the feature information to a judgment feature of the pattern using the calculated approximate vector;
storing the coefficient in the derived conversion formula as a coefficient to be substituted to the conversion formula for extracting the judgment feature of the pattern when carrying out pattern check; and
recalculating the interclass covariance matrix using the judgment feature obtained by the conversion formula; wherein
the computing device repeatedly calculates an optimum vector, calculates an approximate vector, derives a conversion formula, stores the coefficient in the derived conversion formula, and recalculates the interclass covariance matrix, by using the recalculated interclass covariance matrix until reaching a maximum iteration count, which is the number of judgment features.

2. The coefficient determining method according to claim 1, wherein a three layer structure including an input layer for inputting the feature information of the pattern as an input signal, an output layer for outputting the judgment feature to the outside as an output signal, and an intermediate layer for transmitting the signal from the input layer to the output layer is formed, the all nodes of the input layer and the intermediate layer are connected, and the node of the output layer is input a signal from one part of the nodes of the intermediate layer.

3. A feature extracting method for extracting a judgment feature of a pattern; wherein
a computing device of a calculator executes a method comprising:
extracting feature information from each of a plurality of patterns stored in advance for every class in a storage device;
calculating an interclass covariance matrix and an intraclass covariance matrix on a kernel space using the extracted feature information;
calculating an optimum vector which maximizes a ratio of the interclass covariance/intraclass covariance;
calculating an approximate vector which minimizes a square norm with the optimum vector;
deriving a conversion formula for converting the feature information to a judgment feature of the pattern using the calculated approximate vector;
storing the coefficient in the derived conversion formula as a coefficient to be substituted to the conversion formula for extracting the judgment feature of the pattern when carrying out pattern check; and
recalculating the interclass covariance matrix using the judgment feature obtained by the conversion formula;
the computing device repeatedly calculates an optimum vector, calculates an approximate vector, derives a conversion formula, stores the coefficient in the derived conversion formula, and recalculates the interclass covariance matrix, by using the recalculated interclass covariance matrix until reaching a maximum iteration count, which is the number of judgment features; and
the computing device further executes a method comprising,
extracting the feature information from a pattern to be checked; and
computing the judgment feature of the pattern to be checked by substituting the feature information to the conversion formula derived at the time of deriving a conversion formula.

4. A feature extracting system for extracting a judgment feature of a pattern; the feature extracting system comprising:
a feature information extracting device for extracting feature information from each of a plurality of patterns stored in advance for every class in a storage device;
a covariance matrix calculating device for calculating an interclass covariance matrix and an intraclass covariance matrix on a kernel space using the extracted feature information;
an optimum vector calculating device for calculating an optimum vector which maximizes a ratio of the interclass covariance/intraclass covariance;
an approximate vector calculating device for calculating an approximate vector which minimizes a square norm with the optimum vector;
a conversion formula deriving device for deriving a conversion formula for converting the feature information to a judgment feature of the pattern using the calculated approximate vector;
a coefficient storing device for storing the coefficient in the derived conversion formula as a coefficient to be substituted to the conversion formula for extracting the judgment feature of the pattern when carrying out pattern check; and
a covariance matrix recalculating device for recalculating the interclass covariance matrix using the judgment feature obtained by the conversion formula; wherein
the optimum vector calculating device, the approximate vector calculating device, the conversion formula deriving device, the coefficient storing device, and the covariance matrix recalculating device repeatedly execute the processes by using the recalculated interclass covariance matrix until reaching a maximum iteration count, which is the number of judgment features;
the feature information extracting device extracts the feature information from a pattern to be checked when performing pattern check; and
the system further includes a judgment feature computing device for computing the judgment feature of the pattern to be checked by substituting the feature information to the conversion formula derived by the conversion formula calculating device.

5. A feature extracting system for extracting a judgment feature of a pattern; the feature extracting system comprising:
a feature information extracting means for extracting feature information from each of a plurality of patterns stored in advance for every class in a storage means;
a covariance matrix calculating means for calculating an interclass covariance matrix and an intraclass covariance matrix on a kernel space using the extracted feature information;
an optimum vector calculating means for calculating an optimum vector which maximizes a ratio of the interclass covariance/intraclass covariance;
an approximate vector calculating means for calculating an approximate vector which minimizes a square norm with the optimum vector;
a conversion formula deriving means for deriving a conversion formula for converting the feature information to a judgment feature of the pattern using the calculated approximate vector;
a coefficient storing means for storing the coefficient in the derived conversion formula as a coefficient to be substituted to the conversion formula for extracting the judgment feature of the pattern when carrying out pattern check; and a covariance matrix recalculating means for recalculating the interclass covariance matrix using the judgment feature obtained by the conversion formula; wherein the optimum vector calculating means, the approximate vector calculating means, the conversion formula deriving means, the coefficient storing means, and the covariance matrix recalculating means repeatedly execute the processes by using the recalculated interclass covariance matrix until reaching a maximum iteration count, which is the number of judgment features;

the feature information extracting means extracts the feature information from a pattern to be checked when performing pattern check; and the system further includes a judgment feature computing means for computing the judgment feature of the pattern to be checked by substituting the feature information to the conversion formula derived by the conversion formula calculating means.

6. A non-transitory computer readable recording medium having recorded thereon a feature extracting program for extracting a judgment feature of a pattern, the feature extracting program when executed by a computing device of a calculator performs a method comprising:

a feature information extracting process for extracting feature information from each of a plurality of patterns stored in advance for every class in a storage device;

a covariance matrix calculating process for calculating an interclass covariance matrix and an intraclass covariance matrix on a kernel space using the extracted feature information;

an optimum vector calculating process for calculating an optimum vector which maximizes a ratio of the interclass covariance/intraclass covariance;

an approximate vector calculating process for calculating an approximate vector which minimizes a square norm with the optimum vector;

a conversion formula deriving process for deriving a conversion formula for converting the feature information to a judgment feature of the pattern using the calculated approximate vector;

a coefficient storing process for storing the coefficient in the derived conversion formula as a coefficient to be substituted to the conversion formula for extracting the judgment feature of the pattern when carrying out pattern check; and a covariance matrix recalculating process for recalculating the interclass covariance matrix using the judgment feature obtained by the conversion formula;

further causing the computing device to:

repeatedly execute the optimum vector calculating process, the approximate vector calculating process, the conversion formula deriving process, the coefficient storing process, and the covariance matrix recalculating process by using the recalculated interclass covariance matrix until reaching a maximum iteration count, which is the number of judgment features; and further causing the computing device to execute:

a feature information extracting process for extracting the feature information from a pattern to be checked; and a judgment feature computing process for computing the judgment feature of the pattern to be checked by substituting the feature information to the conversion formula derived in the conversion formula calculating process.

7. A pattern checking method for checking a pattern for record and a pattern for check; wherein a computing device of a calculator executes a method comprising:

extracting feature information from each of a plurality of patterns stored in advance for every class in a storage device;

calculating an interclass covariance matrix and an intraclass covariance matrix on a kernel space using the extracted feature information;

calculating an optimum vector which maximizes a ratio of the interclass covariance/intraclass covariance;

calculating an approximate vector which minimizes a square norm with the optimum vector;

deriving a conversion formula for converting the feature information to a judgment feature of the pattern using the calculated approximate vector;

storing the coefficient in the derived conversion formula as a coefficient to be substituted to the conversion formula for extracting the judgment feature of the pattern when carrying out pattern check; and recalculating the interclass covariance matrix using the judgment feature obtained by the conversion formula; wherein the computing device repeatedly calculates an optimum vector, calculates an approximate vector, derives a conversion formula, stores the coefficient in the derived conversion formula, and recalculates the interclass covariance matrix, by using the recalculated interclass covariance matrix until reaching a maximum iteration count, which is the number of judgment features; and the computing device further executes a method comprising, extracting the feature information from the pattern for record and the pattern for check;

computing the judgment feature of the pattern for record and the pattern for check by substituting the feature information to the conversion formula derived at the time of deriving a conversion formula;

computing a similarity by comparing the judgment feature of the pattern for record and the judgment feature of the pattern for check; and determining whether or not the pattern for record and the pattern for check are the same by comparing the calculated similarity with a predetermined threshold value.

8. A pattern checking system for checking a pattern for record and a pattern for check; the pattern checking system comprising:

a feature information extracting device for extracting feature information from each of a plurality of patterns stored in advance for every class in a storage device;

a covariance matrix calculating device for calculating an interclass covariance matrix and an intraclass covariance matrix on a kernel space using the extracted feature information;

an optimum vector calculating device for calculating an optimum vector which maximizes a ratio of the interclass covariance/intraclass covariance;

an approximate vector calculating device for calculating an approximate vector which minimizes a square norm with the optimum vector;

a conversion formula deriving device for deriving a conversion formula for converting the feature information to a judgment feature of the pattern using the calculated approximate vector;

a coefficient storing device for storing the coefficient in the derived conversion formula as a coefficient to be substituted to the conversion formula for extracting the judgment feature of the pattern when carrying out pattern check; and a covariance matrix recalculating device for recalculating the interclass covariance matrix using the judgment feature obtained by the conversion formula; wherein the optimum vector calculating device, the approximate vector calculating device, the conversion formula deriving device, the coefficient storing device, and the covariance matrix recalculating device repeatedly execute the processes by using the recalculated interclass covariance matrix until reaching a maximum iteration count, which is the number of judgment features;

the feature information extracting device extracts the feature information from a pattern for record and the pattern for check when performing pattern check; and the system further includes, a judgment feature computing device for computing the judgment feature of the pattern to be checked by substituting the feature information to the conversion formula derived by the conversion formula deriving device;

a similarity computing device for computing a similarity by comparing the judgment feature of the pattern for record and the judgment feature of the pattern for check; and a target determining device for determining whether or not the pattern for record and the pattern for check are the same by comparing the calculated similarity with a predetermined threshold value.

9. A pattern checking system for checking a pattern for record and a pattern for check; the pattern checking system comprising:

a feature information extracting means for extracting feature information from each of a plurality of patterns stored in advance for every class in a storage means;

a covariance matrix calculating means for calculating an interclass covariance matrix and an intraclass covariance matrix on a kernel space using the extracted feature information;

an optimum vector calculating means for calculating an optimum vector which maximizes a ratio of the interclass covariance/intraclass covariance;

an approximate vector calculating means for calculating an approximate vector which minimizes a square norm with the optimum vector;

a conversion formula deriving means for deriving a conversion formula for converting the feature information to a judgment feature of the pattern using the calculated approximate vector;

a coefficient storing means for storing the coefficient in the derived conversion formula as a coefficient to be substituted to the conversion formula for extracting the judgment feature of the pattern when carrying out pattern check; and a covariance matrix recalculating means for recalculating the interclass covariance matrix using the judgment feature obtained by the conversion formula; wherein the optimum vector calculating means, the approximate vector calculating means, the conversion formula deriving means, the coefficient storing means, and the covariance matrix recalculating means repeatedly execute the processes by using the recalculated interclass covariance matrix until reaching a maximum iteration count, which is the number of judgment features;

the feature information extracting means extracts the feature information from a pattern for record and the pattern for check when performing pattern check; and the system further includes, a judgment feature computing means for computing the judgment feature of the pattern to be checked by substituting the feature information to the conversion formula derived by the conversion formula deriving means;

a similarity computing means for computing a similarity by comparing the judgment feature of the pattern for record and the judgment feature of the pattern for check; and a target determining means for determining whether or not the pattern for record and the pattern for check are the same by comparing the calculated similarity with a predetermined threshold value.

10. A non-transitory computer readable recording medium having recorded there a pattern checking program for checking a pattern for record and a pattern for check; the non-transitory computer readable recording medium when executed by a computing device of a calculator performs a method comprising:

a feature information extracting process for extracting feature information from each of a plurality of patterns stored in advance for every class in a storage device;

a covariance matrix calculating process for calculating an interclass covariance matrix and an intraclass covariance matrix on a kernel space using the extracted feature information;

an optimum vector calculating process for calculating an optimum vector which maximizes a ratio of the interclass covariance/intraclass covariance;

an approximate vector calculating process for calculating an approximate vector which minimizes a square norm with the optimum vector;

a conversion formula deriving process for deriving a conversion formula for converting the feature information to a judgment feature of the pattern using the calculated approximate vector;

a coefficient storing process for storing the coefficient in the derived conversion formula as a coefficient to be substituted to the conversion formula for extracting the judgment feature of the pattern when carrying out pattern check; and a covariance matrix recalculating process for recalculating the interclass covariance matrix using the judgment feature obtained by the conversion formula;

further causing the computing device to:

repeatedly execute the optimum vector calculating process, the approximate vector calculating process, the conversion formula deriving process, the coefficient storing process, and the covariance matrix recalculating process by using the recalculated interclass covariance matrix until reaching a maximum iteration count, which is the number of judgment features; and further causing the computing device to execute:

the feature information extracting process for extracting the feature information from a pattern for record and the pattern for check;

a judgment feature computing process for computing the judgment feature of the pattern for record and the pattern for check by substituting the feature information to the conversion formula derived in the conversion formula deriving process;

a similarity computing process for computing a similarity by comparing the judgment feature of the pattern for record and the judgment feature of the pattern for check; and a target determining process for determining whether or not the pattern for record and the pattern for check are the same by comparing the calculated similarity with a predetermined threshold value.

* * * * *